United States Patent
Golwalkar et al.

(10) Patent No.: US 8,055,665 B2
(45) Date of Patent: Nov. 8, 2011

(54) SORTED SEARCH IN A DISTRIBUTED DIRECTORY ENVIRONMENT USING A PROXY SERVER

(75) Inventors: Yogesh Vilas Golwalkar, Pune (IN); Kristin Marie Hazlewood, Austin, TX (US); Magesh Rajamani, Pune (IN)

(73) Assignee: International Business Machines Corporation, Armonk, NY (US)

( * ) Notice: Subject to any disclaimer, the term of this patent is extended or adjusted under 35 U.S.C. 154(b) by 492 days.

(21) Appl. No.: 12/047,528

(22) Filed: Mar. 13, 2008

(65) Prior Publication Data

US 2009/0234805 A1 Sep. 17, 2009

(51) Int. Cl.
*G06F 7/00* (2006.01)
*G06F 17/30* (2006.01)
(52) U.S. Cl. ...................................... 707/753
(58) Field of Classification Search .................. None
See application file for complete search history.

(56) References Cited

U.S. PATENT DOCUMENTS

| | | | |
|---|---|---|---|
| 4,510,567 A * | 4/1985 | Chang et al. ............ | 1/1 |
| 5,089,985 A * | 2/1992 | Chang et al. ............ | 1/1 |
| 5,809,497 A | 9/1998 | Freund et al. | |
| 6,119,079 A | 9/2000 | Wang et al. | |
| 6,490,619 B1 | 12/2002 | Byrne et al. | |
| 6,970,883 B2 | 11/2005 | Ku et al. | |
| 7,127,416 B1 | 10/2006 | Tenorio | |
| 7,130,885 B2 | 10/2006 | Chandra et al. | |
| 7,451,403 B1 | 11/2008 | Srinivasan et al. | |
| 2002/0120697 A1 | 8/2002 | Generous et al. | |
| 2003/0096600 A1 | 5/2003 | Lewis et al. | |
| 2004/0019487 A1 | 1/2004 | Kleindienst et al. | |
| 2004/0102957 A1 | 5/2004 | Levin | |
| 2005/0249172 A1 | 11/2005 | Malik | |
| 2006/0143160 A1 | 6/2006 | Vayssiere | |
| 2006/0209868 A1 | 9/2006 | Callaghan | |
| 2006/0276208 A1 | 12/2006 | Jain | |
| 2007/0043750 A1 | 2/2007 | Dingle | |

(Continued)

FOREIGN PATENT DOCUMENTS

WO 2006011641 A1 2/2006

OTHER PUBLICATIONS

U.S. Appl. No. 12/198,991, filed Aug. 27, 2008, Golwalkar et al.

(Continued)

*Primary Examiner* — Kavita Padmanabhan
(74) *Attorney, Agent, or Firm* — Yee & Associates, P.C.; Jeffrey S. LaBaw

(57) ABSTRACT

A mechanism for performing a sorted search in a distributed directory environment using a proxy server. A sorted search request for a set of top entries is sent to each backend server. The proxy server identifies a target server which returned a top entry in the set and sends another sorted search request to the target server for all entries having a sort order higher than or equal to the top entry and a sort order lower than or equal to the next top entry of the set, and returns the entries to a requesting client. The proxy server sends another sorted search request to the target server for a new top entry having a sort order greater than the next top entry and adds the new top entry to the set. The proxy server returns to the evaluating step until no top entries remain in the set.

20 Claims, 3 Drawing Sheets

U.S. PATENT DOCUMENTS

| | | |
|---|---|---|
| 2007/0044011 A1 | 2/2007 | Cottrille et al. |
| 2007/0106630 A1 | 5/2007 | Fitzgerald et al. |
| 2008/0104094 A1 | 5/2008 | Cowham et al. |
| 2008/0140963 A1 | 6/2008 | Thomason et al. |
| 2009/0193013 A1 | 7/2009 | Hazlewood et al. |
| 2009/0216779 A1 | 8/2009 | Hazlewood et al. |

OTHER PUBLICATIONS

USPTO office action for U.S. Appl. No. 12/036,665 dated Sep. 7, 2010.

USPTO office action for U.S. Appl. No. 12/036,665 dated Jun. 15, 2010.

USPTO office action for U.S. Appl. No. 12/022,412 dated Jul. 26, 2010.

USPTO office action for U.S. Appl. No. 12/022,412 dated Mar. 24, 2010.

USPTO Notice of allowance for U.S. Appl. No. 12/198,991 dated Aug. 10, 2010.

U.S. Appl. No. 13/004,463, filed Jan. 11, 2011, Golwalkar et al.

* cited by examiner

SORTED SEARCH IN A DISTRIBUTED DIRECTORY ENVIRONMENT USING A PROXY SERVER

BACKGROUND OF THE INVENTION

1. Field of the Invention

Embodiments of the present invention relate generally to an improved data processing system, and in particular to a computer implemented method, data processing system, and computer program product for performing a sorted search in a distributed directory environment using a proxy server.

2. Description of the Related Art

In today's computing environment, complex network data processing systems often are needed to facilitate work in large corporations. These complex networks may even span across regions in various worldwide locations, as well as use the Internet as part of a virtual private network for conducting business. In many instances, a federated data model is employed to allow enterprise components to share and access information and resources throughout the network. With the federated data model, wherein multiple data sources appear as one to users, data resides and is controlled locally, and client users in the system, regardless of location, needing the information may access the data using a directory service.

A directory is a special type of database for managing information about people, organizations, data processing systems, and other information sources. Information within a directory is organized within a hierarchical namespace. Each entry in the directory is a named object and consists of a set of attributes. Each attribute has a defined attribute type and one or more values. Each entry is identified by an unambiguous distinguished name (DN), wherein a distinguished name is a concatenation of selected attributes from an entry. A directory service provides a mechanism for searching a directory and for retrieving information from a directory.

Directory services serve as central repository for searching, adding, deleting and modifying data. Example methods of accessing directory services in a computer network include X.500 and Lightweight Directory Access Protocol (LDAP). Lightweight Directory Access Protocol (LDAP) is a software protocol for enabling a user to locate organizations, individuals, and other resources such as files and devices in a network, whether on the Internet or on a corporate Intranet. LDAP is a "lightweight" version of Directory Access Protocol (DAP), which is part of X.500, a standard for directory services in a network.

A directory may be distributed among many servers. In a distributed directory environment, data is partitioned across multiple directory servers, also known as backend servers. Distributed directory environments may include one or more backend servers and a proxy server that acts as an intermediate agent between a client and the distributed directory environment. Clients bind to the proxy server instead of directly binding to the backend servers.

SUMMARY OF THE INVENTION

The illustrative embodiments provide a computer implemented method, data processing system, and computer program product for performing a sorted search in a distributed directory environment using a proxy server. The proxy server sends a first sorted search request to a set of backend servers for a set of top entries from each of the backend servers. The proxy server evaluates which of the backend servers has returned a top entry of the set of top entries. The proxy server sends a second sorted search request to a backend server which had the top entry, with a search filter for all entries having a sort order higher than or equal to the top entry and a sort order lower than or equal to the next top entry of the set of top entries. All entries from the second sorted search request are returned to a requesting client. The proxy server sends a sorted search request to the backend server which had the top entry for a new top entry having a sort order greater than the next top entry. The proxy server adds the new top entry to the set of top entries, and returns to the evaluating step until there are no more top entries in the set of top entries.

DETAILED DESCRIPTION OF THE PREFERRED EMBODIMENT

In general, the devices that may comprise or relate to the illustrative embodiments include a wide variety of data processing technology. Therefore, as background, a typical organization of hardware and software components within a distributed data processing system is described prior to describing the illustrative embodiments in more detail.

Figure 1:
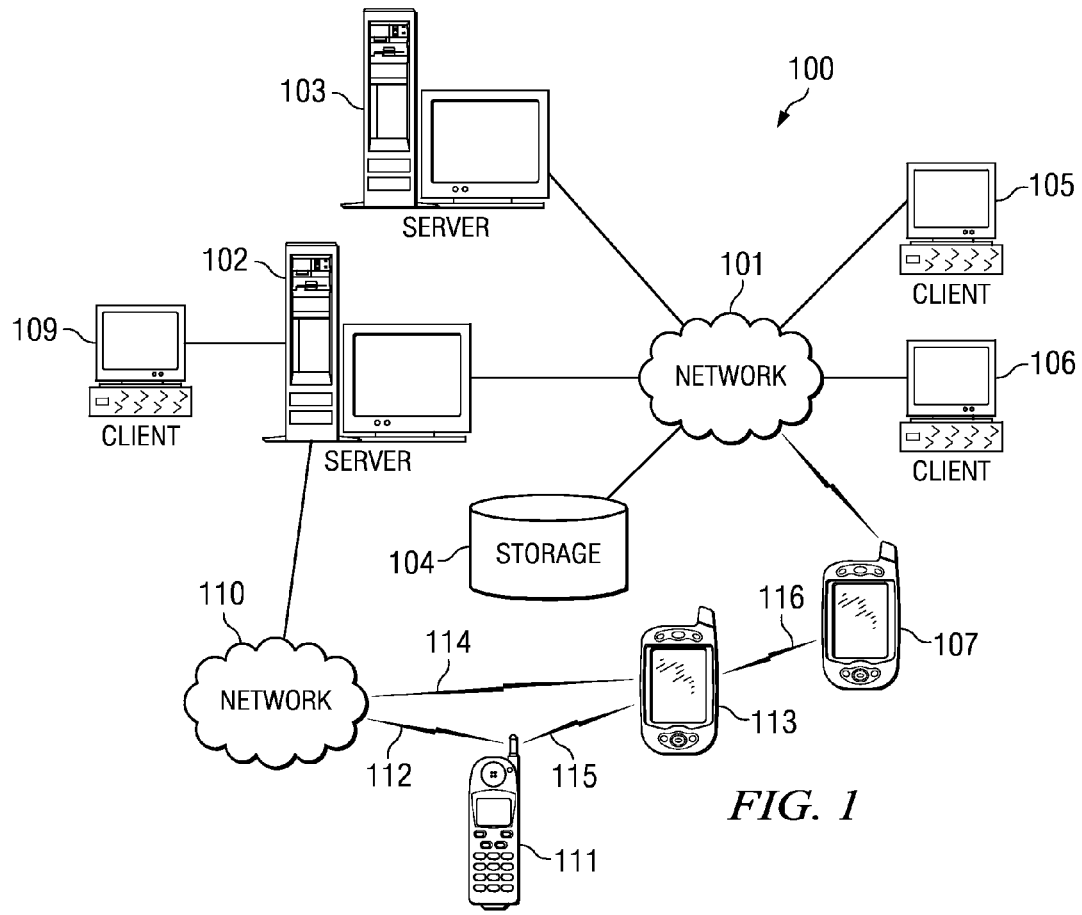
FIG. 1 depicts a pictorial representation of a distributed data processing system in which the illustrative embodiments may be implemented.

With reference now to the figures, FIG. 1 depicts a typical network of data processing systems, each of which may implement a portion of the illustrative embodiments. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), and the like. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), File Transfer Protocol (FTP), Hypertext Transport Protocol (HTTP), Wireless Application Protocol (WAP), and so on. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth wireless technology, to create so-called personal area networks (PAN) or personal ad-hoc networks. In a similar manner, PDA 113 can transfer data to PDA 107 via wireless communication link 116.

The illustrative embodiments may be implemented on a variety of hardware platforms; FIG. 1 is intended as an example of a heterogeneous computing environment and not as an architectural limitation for the illustrative embodiments.

Figure 2:
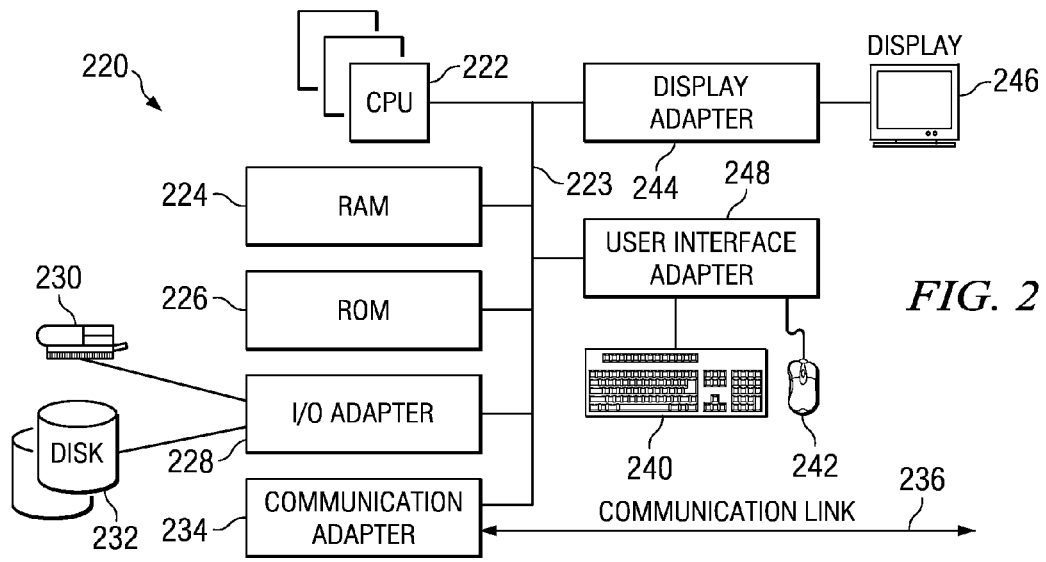
FIG. 2 is a block diagram of a typical computer architecture that may be used within a data processing system in which the illustrative embodiments may be implemented.

With reference now to FIG. 2, a diagram depicts a typical computer architecture of a data processing system, such as those shown in FIG. 1, in which the illustrative embodiments may be implemented. Data processing system 220 contains one or more central processing units (CPUs) 222 connected to internal system bus 223, which interconnects random access memory (RAM) 224, read-only memory 226, and input/output adapter 228, which supports various I/O devices, such as printer 230, disk units 232, or other devices not shown, such as an audio output system, and the like. System bus 223 also connects communication adapter 234 that provides access to communication link 236. User interface adapter 248 connects various user devices, such as keyboard 240 and mouse 242, or other devices not shown, such as a touch screen, stylus, microphone, etc. Display adapter 244 connects system bus 223 to display device 246.

Those of ordinary skill in the art will appreciate that the hardware in FIG. 2 may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 2. The depicted examples are not meant to imply architectural limitations with respect to the illustrative embodiments.

In addition to being able to be implemented on a variety of hardware platforms, the illustrative embodiments may be implemented in a variety of software environments. A typical operating system may be used to control program execution within each data processing system. For example, one device may run a UNIX operating system, while another device contains a simple Java runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The illustrative embodiments may be implemented on a variety of hardware and software platforms, as described above with respect to FIG. 1 and FIG. 2. More specifically, though, the illustrative embodiments are directed to an improved distributed data processing environment. Prior to describing the illustrative embodiments in more detail, some aspects of typical distributed data processing environments are described.

The descriptions of the figures herein may involve certain actions by either a client device or a user of the client device. One of ordinary skill in the art would understand that responses and/or requests to/from the client are sometimes initiated by a user and at other times are initiated automatically by a client, often on behalf of a user of the client. Thus, when a client or a user of a client is mentioned in the description of the figures, it should be understood that the terms "client" and "user" can be used interchangeably without significantly affecting the meaning of the described processes.

Certain computational tasks may be described below as being performed by functional units. A functional unit may be represented by a routine, a subroutine, a process, a subprocess, a procedure, a function, a method, an object-oriented object, a software module, an applet, a plug-in, an Active control, a script, or some other component of firmware or software for performing a computational task.

The descriptions of the figures herein may involve an exchange of information between various components, and the exchange of information may be described as being implemented via an exchange of messages, e.g., a request message followed by a response message. It should be noted that an exchange of information between computational components, which may include a synchronous or asynchronous request/response exchange, may be implemented equivalently via a variety of data exchange mechanisms, such as messages, method calls, remote procedure calls, event signaling, or other mechanism.

Figure 3:
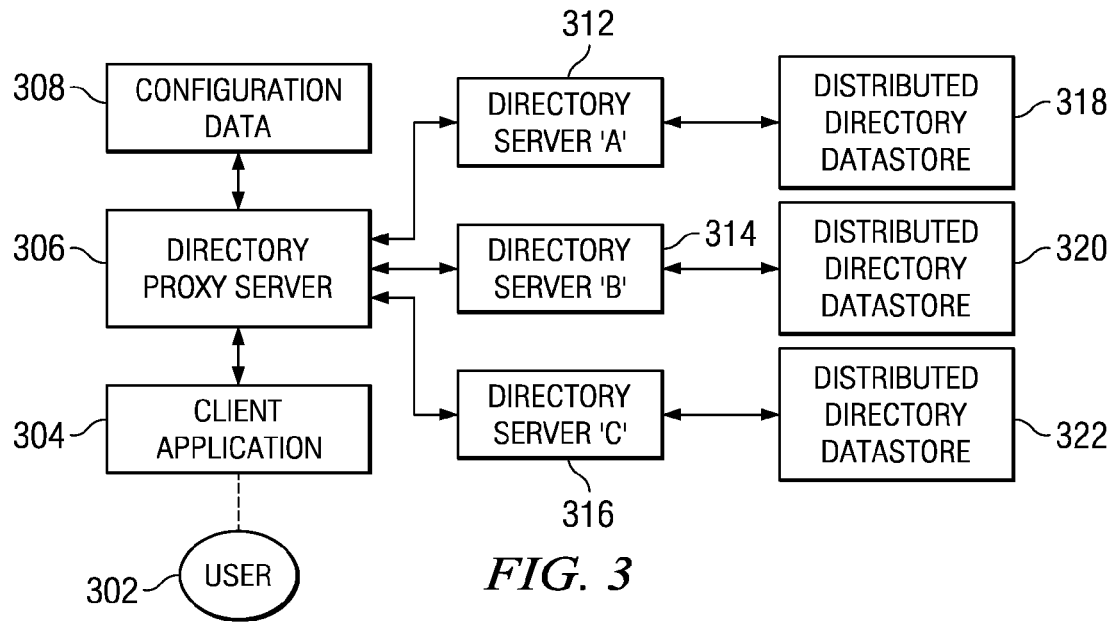
FIG. 3 depicts a block diagram that shows a typical distributed directory environment.

With reference now to FIG. 3, a block diagram depicts a typical distributed directory environment. User 302 operates client application 304, which may execute on a client device such as client 109 shown in FIG. 1. Client application 304 interacts with directory servers through a proxied directory server, also known as a directory proxy server or a proxy directory server, which is shown as proxy server 306; proxy server 306 may execute on the user's client device or elsewhere within a network of connected devices, such as those shown in FIG. 1. Proxy server 306 may be associated with configuration files 308 that contain information that is managed via an administrative user application to control the functionality of proxy server 306.

Proxy server 306 acts as an intermediate agent (an "intermediary") to the distributed directory environment. Although only one proxy server is shown, there may be multiple such proxy servers or proxy server instances running on one or more physical machines. Proxy server 306 is able to perform operations in accordance with a variety of directory schemes and protocols.

The distributed directory environment includes multiple directory servers 312-316 that interoperate within the same distributed data processing environment as proxy server 306 and client application 304, e.g., in a manner similar to the distributed data processing environment shown in FIG. 1. Directory servers 312-316 support functionality for accessing datastores that contain portions of a distributed directory, i.e. portions of a directory information tree, shown as distributed directory datastores 318-322. A typical directory datastore is a relational database management (RDBM) server.

Data entries that are of interest to a particular directory operation may reside in different portions of a distributed directory that are supported on different systems. Thus, a distributed directory is a directory environment in which data is partitioned across multiple directory servers. As illustrated in FIG. 3, the distributed directory typically comprises a collection of machines including relational database management (RDBM) servers holding data, and one or more proxy servers managing the topology. A representative proxy server may be an IBM® Tivoli® Directory Server that provides, among other functions, request routing, load balancing, failover, distributed authentication and support for distributed/membership groups and partitioning of containers. As described above, the directory proxy server sits at the front-end of a distributed directory and provides efficient routing of user requests thereby improving performance, and providing a unified directory view to the client. The proxy server also provides data support for groups and access control lists (ACLs) that are not affected by partitioning, and support for partitioning of flat namespaces.

Thus, in a distributed directory environment, data is partitioned across multiple directory servers, or backend servers, and a proxy server may act as an intermediate agent between a client and the backend servers. When the client wants to obtain data stored on the backend servers in a sorted format, the client sends a request for sorted data to the proxy server. Since the requested data is distributed across multiple servers, when the proxy server collects the data matching the search request from each of the backend servers, the proxy server must sort the collected data before sending the data to the client. One existing method of sorting the data collected from multiple backend servers at the proxy server comprises performing a simple merge sort. In a simple merge sort, the proxy server fetches all of the data entries in the backend servers which match the data search request using a search filter, and then the proxy server resorts all of these collected entries. However, a problem with the merge sort method is that the memory requirement of the proxy may be required to greatly increase in size to accommodate large numbers of collected entries (e.g., potentially millions of entries will be placed in the proxy's memory). Thus, the merge sort method is not practical or efficient when the data set returned from the backend servers grows in size.

Another method of sorting the data collected from multiple backend servers at the proxy server comprises having the proxy server request paged searches containing a set number of entries from the backend servers. The backend servers provide the proxy with the requested number of pages, and the proxy server processes the pages one by one. Consequently, no increase in the memory requirement of the proxy server is required to accommodate the pages. However, it can be difficult to determine the optimal size of the page for efficiency. For example, the top 100 sorted search entries may have been obtained from the same backend server. The proxy server will still process the retrieved pages one by one until the top 100 entries from that backend server are completed, even though the backend server already provided these 100 entries in sorted order to the proxy server. The proxy server will then process page by page the entries received from the other backend servers.

The illustrative embodiments provide a solution to the problems above by providing an improved mechanism for performing an optimized sorted search in a distributed directory environment using a proxy server. In particular, the mechanism enables the proxy server to provide sorted search results obtained from multiple directory servers in a distributed directory environment while avoiding the memory space or page size issues on the proxy server in current sorted search solutions.

In the illustrative embodiments, a client may send a request for data in a sorted format to the proxy server. The request may contain a set of attributes and a search filter that defines the data desired by the client. For example, the request may comprise a search filter for obtaining the names of all employees in a company who participate in the company's 401k plan. The request may also comprise an attribute specifying how the client wants the returned data to be formatted, such as sorted in ascending or descending alphabetical or numerical order. Thus, the client request may comprise a search filter value (f) and a sort key (k), which is provided to the proxy server.

Upon receiving the request from the client, the proxy server sends a sorted search request to the backend servers in the distributed directory using the sort key k sent in the client request. The sorted search request requests a single entry (i.e., the request specifies a size limit of 1) from each of the backend servers. The result returned to the proxy server from each backend server is the "top" sorted entry from each server. The "top" sorted entry is the first entry listed in a set of sorted search results of a backend server. The top entries returned from the backend servers are called index entries, as they are used as indexes into each of the backend servers, and are stored in an index array on the proxy server.

The proxy server then sorts these index entries in the index array by their sort key (k) values. For instance, if the sort key specifies that the index entries are to be sorted in alphabetical order, an index entry that begins with the lowest letter (e.g., "A") will be the first index entry (e.g., indexVal1), the index entry that begins with the next lowest letter (e.g., "C") will be the second index entry (e.g., indexVal2), etc. The backend server associated with the lowest or "top" index entry (e.g., indexVal1) is the target backend server.

Once the top index entry is determined, the proxy server collects the entries on the target backend server with sort values that are greater than or equal to the sort value indexVal1 and less than or equal to sort value indexVal2. To collect these entries, the proxy server creates a new search filter value (f2) using the original search filter value f and concatenating the search filter with an 'and' operator. The resulting f2 search filter is k<=indexVal2 && k>=indexVal1. Search filter f2 requests all the entries between indexVal1 and indexVal2 that also match the original search filter. If there is no indexVal2, the proxy server omits building that part of the search filter. The proxy server sends a sorted search request to the target backend server with sort key k and search filter f2. As the sorted entries matching search filter f2 are returned from the backend server, the proxy server returns these sorted entries to the requesting client. The proxy server updates the index array to remove the index entry for the target backend server.

If there are any index entries remaining in the index array, the proxy server collects the next entry from the target backend server. To collect this next entry, the proxy server creates a new search filter (f3) using the original filter f and concatenating the search filter. The resulting f3 search filter locates the next entry in the target backend server which has a sort value (k) greater than the second index entry (indexVal2). In one example, the resulting f3 search filter may be represented as k>indexVal2. However, the particular form of the f3 search filter may depend on the particular protocol used. For example, the f3 search filter may be represented within the LDAP protocol as (k>=indexVal2) && (!(k=indexVal2)).

Once the f3 search filter is created, the proxy server sends a sorted search request to the target backend server with sort key k, search filter f3, and a size limit of 1 requesting a single entry. The entry returned from the target backend server is added to the index array as a new indexVal for that server. If no entry is returned, no new index value is added to the list of indexed entries.

The proxy server may repeat the sorting and collecting steps specified above until there are no more index entries remaining in the index array.

The illustrative embodiments may be implemented using X.500 directories and Lightweight Directory Access Protocol (LDAP) operations, as well as using a variety of directory implementation schemes and protocols. The illustrative embodiments may extend to any distributed data environment having an agent or proxy server aware of the partitioning of the data across the distributed databases.

Figure 4:
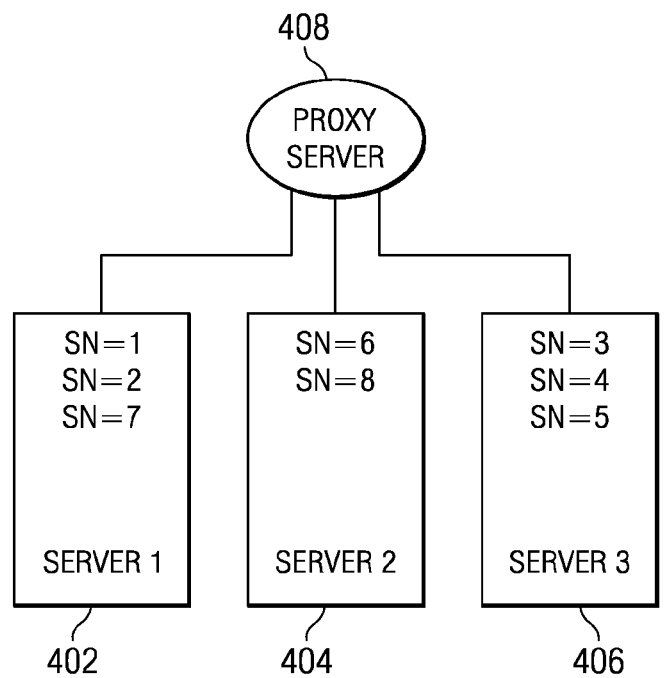
FIG. 4 illustrates how the sorted search algorithm may be implemented in a distributed directory environment in accordance with the illustrative embodiments.

FIG. 4 illustrates how the optimized sorted search algorithm may be implemented in a distributed directory environment in accordance with the illustrative embodiments. In this illustrative example, the distributed directory environment comprises three backend servers. Backend servers 402, 404, and 406 are examples of directory servers in a distributed directory environment, such as directory servers 312-316 in FIG. 3.

When a client requests sorted data from the backend servers through proxy server 408, the proxy server obtains the search filter f and the particular sort attribute k for the search from the requesting client. For example, a client may request the names of all employees who participate in a company's stock options plan in alphabetical order. The search filter in such a request is used to identify and return the names of all the employees in the company, and the sort attribute as SN and the preferred sort order of the returned data is specified as alphabetical order. As shown, the requested data is stored across multiple backend servers (402, 404, and 406). The data entries matching the client request on each backend server are represented for purposes of illustration in FIG. 4 by their sort key values (SN=1 to SN=8 in this example). The data entries on each backend server are also sorted based on the sort key from the client.

The optimized sorted search algorithm in the illustrative embodiments may be implemented in five general steps. In a first step, proxy server 408 sends a sorted search request comprising the search filter (objectclass=*) and the sort attribute (SN) to backend servers 402, 404, and 406. The request also comprises a request for a size limit of 1, meaning that only one entry from each of the backend servers will be returned to proxy server 408. The results of the sorted search are shown in backend servers 402, 404, and 406. The single entry returned from each of the backend servers is the top sorted entry in the sorted searches (e.g., SN=1, SN=6, SN=3). These top sorted entries are the index entries. As the index entries are obtained from each backend server, the index entries are stored in an index array on proxy server 408. An array index denotes the partition index of the backend server from which the result was received.

In a second step, proxy server 408 sorts the three returned index entries (SN=1, SN=6, SN=3) based on the sort key (SN). From the sorted order of index entries (SN=1, SN=3, SN=6), proxy server 408 may determine which of the index entries is the top sorted entry. In this example, entry SN=1 is the top index entry.

In a third step, proxy server 408 sends a sorted search request to the target server which returned the top index entry (e.g., backend server 402). This sorted search request comprises a new search filter generated by proxy server 408, wherein the new filter is created to provide all of the entries from the target server (backend server 402) in sorted order which have a value equal to or higher than the top index entry and a value equal to or lower than the second top index entry (k<=indexVal2 && k>=indexVal1). In this example, the new search filter is defined as (SN<=3 && SN>=1) && (objectclass=*). The result of the sorted search request from the target server is entries SN=1 and SN=2. The result of the sorted search request is sent directly to the requesting client, since the result is already in sorted order. Consequently, entries SN=1 and SN=2 are sent to the client. Entries SN=3 and SN=6 remain in the list of top index entries.

In a fourth step, proxy server 408 searches for the next top sorted entry on the target server (backend server 402). Proxy server 408 sends another sorted search request with a size limit as 1 to the target server. The sorted search request comprises a new search filter to obtain the next entry on the target server with a sort value greater than the current top index entry (SN=3). In this particular example, the new search filter may be defined as (SN>3) && (objectclass=*), and the result returned is SN=7. If backend server 402 returns an entry, this entry will be stored in the index array to denote the partition index of the backend server from which the entry was received. If there are no entries returned by backend server 402, the index will be marked as complete. Only the remaining array indexes will be used in further processing.

In a fifth step, proxy server 408 determines if there are any index entries remaining in the index array. If so, proxy server 408 repeats steps two through four for the current index entry set. Thus, proxy server 408 repeats step two by sorting the three current index entries (SN=3, SN=6, SN=7) based on the sort key (SN). In this example, entry SN=3 is now the top index entry. Proxy server 408 repeats step three by sending a sorted search request to the target server which returned the current top index entry SN=3 (e.g., backend server 406). The sorted search request comprises a new search filter created to provide all of the entries from the current target server (backend server 406) in sorted order which have a value equal to or higher than the top index entry and a value equal to or lower than the current second top index entry (e.g., SN<=6 && SN>=3) && (objectclass=*). The result of the sorted search request from the target server is entries SN=3, SN=4, and SN=5. The resulting entries SN=3, SN=4, and SN=5 are sent directly to the requesting client. Entries SN=6 and SN=7 remain in the list of top index entries. Proxy server 408 also repeats step four by searching for the next top sorted entry on the target server (backend server 406). Proxy server 408 sends another sorted search request with a size limit as 1 to backend server 406 with a new search filter (SN>6) && (objectclass=*). No result is returned, so no index entry is added to the index array.

Since there are index entries remaining in the index array (e.g., SN=6, SN=7), proxy server 408 repeats steps two through four for the current set of index entries SN=6 and SN=7. Proxy server 408 repeats step two by sorting index entries SN=6 and SN=7 based on the sort key (SN) to determine the top index entry SN=6. Proxy server 408 repeats step three by sending a sorted search request to backend server 404 which returned the current top index entry SN=6. The new search filter (SN<=6 && SN>=7) && (objectclass=*) returns a result of entries SN=6, which is sent directly to the requesting client. Entry SN=7 remains in the list of top index entries. Proxy server 408 repeats step four by searching for the next top sorted entry on the target server (backend server 404). Proxy server 408 sends another sorted search request with a size limit as 1 to backend server 404 with a new search filter (SN>6) && (objectclass=*). The result returned is entry SN=8, which is stored in the index array.

Since there are index entries remaining in the index array (e.g., SN=7, SN=8), proxy server 408 again repeats steps two through four for the current set of index entries SN=7 and SN=8. Proxy server 408 repeats step two by sorting index entries SN=7 and SN=8 based on the sort key (SN) to determine the top index entry SN=7. Proxy server 408 repeats step three by sending a sorted search request to backend server 402 which returned the current top index entry SN=7. The new search filter (SN<=8 && SN>=7) && (objectclass=*) returns a result of entry SN=7, which is sent directly to the requesting client. Entry SN=8 remains in the list of top index entries. Proxy server 408 repeats step four by searching for the next top sorted entry on the target server (backend server 402).

Proxy server 408 sends another sorted search request with a size limit as 1 to backend server 402 with a new search filter (SN>7) && (objectclass=*). No result is returned, so no index entry is added to the index array.

Since there is one index entry remaining in the index array (e.g., SN=8), proxy server 408 again repeats steps three through four for the current index entry SN=8. Proxy server 408 repeats step three by sending a sorted search request to backend server 404 which returned the current top index entry SN=8. The new search filter (SN>=8) && (objectclass=*) returns a result of entry SN=8, which is sent directly to the requesting client. As there are no more index entries remaining, the search is complete.

Figure 5:
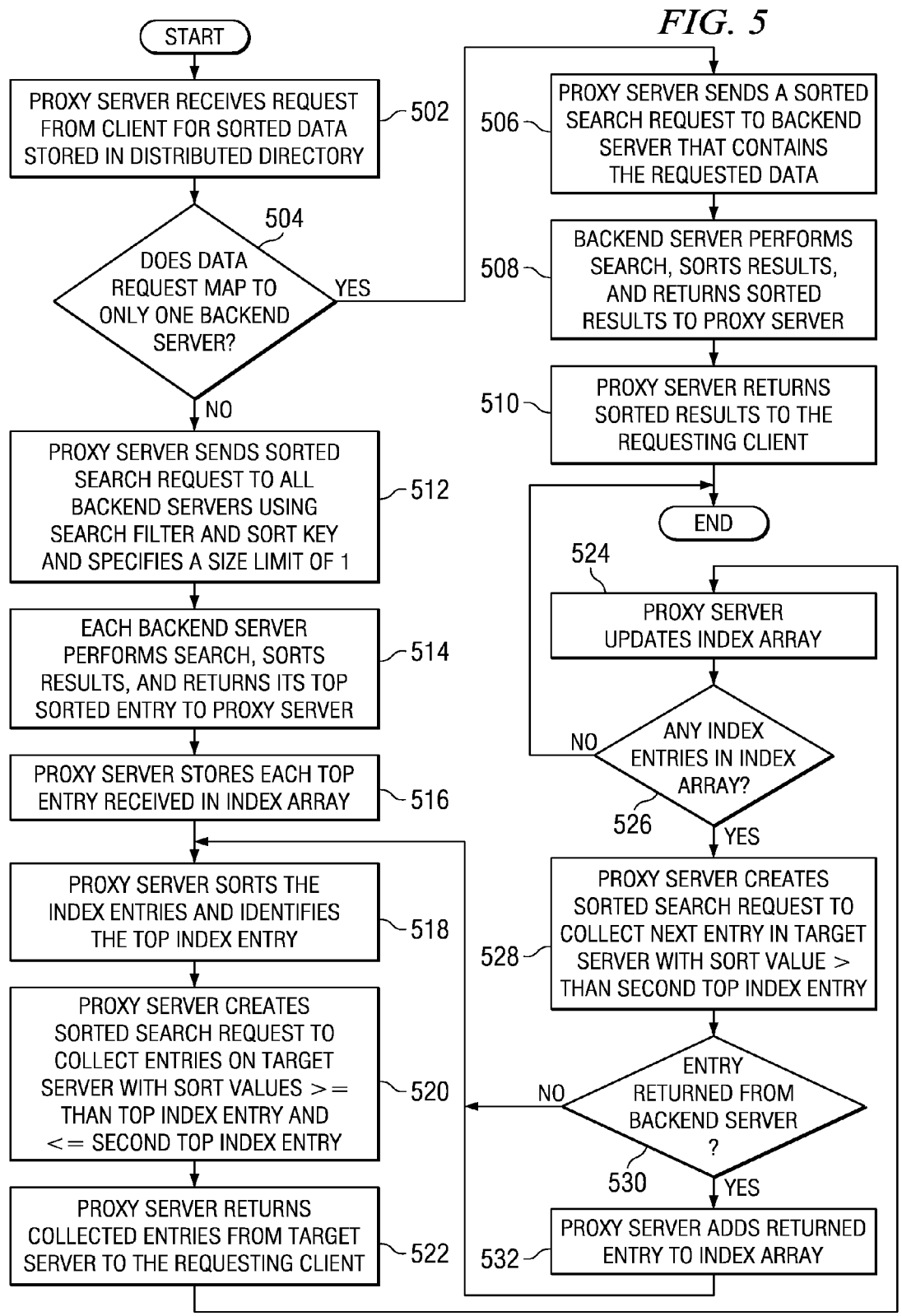
FIG. 5 illustrates a flowchart of a process for performing a sorted search in a distributed directory environment using a proxy server in accordance with the illustrative embodiments.

FIG. 5 illustrates a flowchart of a process for performing a sorted search in a distributed directory environment using a proxy server in accordance with the illustrative embodiments. The process described in FIG. 5 may be implemented using a proxy server in a distributed directory environment such as depicted in FIG. 3.

The process begins when the client sends a request for sorted data stored in the distributed directory to the proxy server (step 502). The client request comprises the search filter (f) and the sort key (k) for the requested search. When the proxy server receives the request information, the proxy server determines whether the requested search maps to only one backend server in the distributed directory environment (e.g., a client request for personnel data on a group of employees who work in the same office or city) (step 504). If the requested search only maps to one backend server ('yes' output of step 504), the proxy server sends a sorted search request to the backend server that contains the requested data (step 506). The backend server performs the search, sorts the data results, and returns the sorted data to the proxy server 508). The proxy server returns the sorted data to the requesting client (step 510).

Turning back to step 504, if the requested search maps to more than one backend server ('no' output of step 504), the proxy server sends a sorted search request to all of the backend servers in the distributed directory using the search filter and the sort key from the client (step 512). The sorted search request requests a single entry from each of the backend servers (i.e., a size limit of 1). Each backend server performs the search, sorts the data results, and returns its top (first) entry in the sorted search data to the proxy server (step 514). The proxy server stores each top entry received in an index array (step 516).

The proxy server then sorts these index entries by their sort key values and identifies the target backend server as the backend server associated with the top index entry (step 518). The proxy server creates a new search filter in a sorted search request which collects the entries on the target backend server with sort values that are greater than or equal to the sort value of the top index entry and less than or equal to the sort value of the second top index entry (step 520). If there is no second top index entry, the proxy server omits building that part of the search filter. As the entries are returned from the target backend server, the proxy server returns the entries to the requesting client (step 522). The proxy server also updates the index array to remove the index entries sent to the client (step 524).

The proxy server then makes a determination as to whether any index entries remain in the index array (step 526). If no index entries remain ('no' output of step 526), the process terminates thereafter. However, if there are index entries in the index array ('yes' output of step 526), the proxy server creates a new search filter in a sorted search request to collect the next entry in the backend target server with a sort value that is greater than the sort value of the second top index entry (step 528). A determination is made by the proxy server as to whether an entry is returned from the target backend server (step 530). If no entry is returned ('no' output of step 530), no new index value is added to the list of indexed entries. If an entry is returned ('yes' output of step 530), the entry returned from the target backend server is added to the list of indexed entries in the index array (step 532).

The proxy server repeats steps 518-532 as long as there are index entries remaining in the index array.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The invention can also take the form of a computer program product which has been downloaded over a network from one device to another for use in the other device. For instance, the program code stored in a computer readable storage medium in a server data processing system may be downloaded over a network from the server to a remote data processing system, such as a client or another server. Likewise, the program code stored in a computer readable storage medium in a client data processing system may be downloaded over a network from the client to a remote data processing system, such as a server or another client.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for performing a sorted search in a distributed directory environment using a proxy server, the computer implemented method comprising:
    by the proxy server, sending a first sorted search request to a set of backend servers for a top entry from each of the backend servers, and receiving responses thereto to form a set of top entries;
    by the proxy server, evaluating which of the backend servers has returned an utmost top entry with respect to other top entries of the set of top entries;
    by the proxy server, sending a second sorted search request to a backend server which had the utmost top entry, with a search filter for all entries having a sort order higher than or equal to the utmost top entry and a sort order lower than or equal to a next utmost top entry with respect to the other top entries of the set of top entries;
    returning all entries from the second sorted search request to a requesting client;
    by the proxy server, sending a sorted search request to the backend server, which had the utmost top entry, for a new top entry having a sort order greater than the next utmost top entry;
    adding the new top entry to the set of top entries; and
    returning to the evaluating step until there are no more top entries in the set of top entries.

2. The computer implemented method of claim 1, wherein the first sorted search request comprises a search filter, a sort key, and a size request of 1.

3. The computer implemented method of claim 1, wherein evaluating which of the backend servers has returned an utmost top entry of the set of top entries comprises:
    sorting the set of top entries to determine the utmost top entry in the set of top entries; and
    identifying the backend server which returned the utmost top entry.

4. The computer implemented method of claim 1, wherein returning all entries from the second sorted search request to a requesting client further comprises:
    removing a given top entry from the set of top entries if the given top entry is an entry returned from the second sorted search request.

5. The computer implemented method of claim 1, wherein the set of top entries are stored in an index array on the proxy server.

6. The computer implemented method of claim 1, wherein sending a second sorted search request to a backend server which had the utmost top entry comprises:
    responsive to a determination that there is only one entry remaining in the set of top entries, sending the second sorted search request, with a search filter for all entries having a sort order higher than or equal to the utmost top entry.

7. The computer implemented method of claim 1, wherein the set of top entries consists of a lowest sorted entry from each backend server in the set of backend servers.

8. A proxy server for performing a sorted search in a distributed directory environment, the proxy server comprising:
    a bus;
    a storage device connected to the bus, wherein the storage device contains computer usable code;
    at least one managed device connected to the bus;
    a communications unit connected to the bus; and
    a processing unit connected to the bus, wherein the processing unit executes the computer usable code to send a first sorted search request to a set of backend servers for a top entry from each of the backend servers, and receive responses thereto to form a set of top entries; evaluate which of the backend servers has returned an utmost top entry with respect to other top entries of the set of top entries; send a second sorted search request to a backend server which had the utmost top entry, with a search filter for all entries having a sort order higher than or equal to the utmost top entry and a sort order lower than or equal to a next utmost top entry with respect to the other top entries of the set of top entries; return all entries from the second sorted search request to a requesting client; send a sorted search request to the backend server, which had the utmost top entry, for a new top entry having a sort order greater than the next utmost top entry; add the new top entry to the set of top entries; and return to the evaluating step until there are no more top entries in the set of top entries.

9. The proxy server of claim 8, wherein the first sorted search request comprises a search filter, a sort key, and a size request of 1.

10. The proxy server of claim 8, wherein the computer usable code to evaluate which of the backend servers has returned an utmost top entry of the set of top entries comprises:
    computer usable code to sort the set of top entries to determine the utmost top entry in the set of top entries; and
    computer usable code to identify the backend server which returned the utmost top entry.

11. The proxy server of claim 8, wherein the computer usable code to return all entries from the second sorted search request to a requesting client further comprises:
    computer usable code to remove a given top entry from the set of top entries if the given top entry is an entry returned from the second sorted search request.

12. A computer program product for performing a sorted search in a distributed directory environment using a proxy server, the computer program product comprising:
    a non-transitory computer usable storage medium having computer usable program code tangibly stored thereon, the computer usable program code comprising:
    computer usable program code for sending a first sorted search request to a set of backend servers for a top entry from each of the backend servers, and receiving responses thereto to form a set of top entries;
    computer usable program code for evaluating which of the backend servers has returned an utmost top entry with respect to other top entries of the set of top entries;
    computer usable program code for sending a second sorted search request to a backend server which had the utmost top entry, with a search filter for all entries having a sort order higher than or equal to the utmost top entry and a sort order lower than or equal to a next utmost top entry with respect to the other top entries of the set of top entries;

computer usable program code for returning all entries from the second sorted search request to a requesting client;

computer usable program code for sending a sorted search request to the backend server, which had the utmost top entry, for a new top entry having a sort order greater than the next utmost top entry;

computer usable program code for adding the new top entry to the set of top entries; and computer usable program code for returning to the evaluating step until there are no more top entries in the set of top entries.

13. The computer program product of claim 12, wherein the first sorted search request comprises a search filter, a sort key, and a size request of 1.

14. The computer program product of claim 12, wherein the computer usable program code for evaluating which of the backend servers has returned an utmost top entry of the set of top entries comprises:

computer usable program code for sorting the set of top entries to determine the utmost top entry in the set of top entries; and computer usable program code for identifying the backend server which returned the utmost top entry.

15. The computer program product of claim 12, wherein the computer usable program code for returning all entries from the second sorted search request to a requesting client further comprises:

computer usable program code for removing a given top entry from the set of top entries if the given top entry is an entry returned from the second sorted search request.

16. The computer program product of claim 12, wherein the set of top entries are stored in an index array on the proxy server.

17. The computer program product of claim 12, wherein the computer usable program code for sending a second sorted search request to a backend server which had the utmost top entry comprises:

computer usable program code for sending, in response to a determination that there is only one entry remaining in the set of top entries, the second sorted search request, with a search filter for all entries having a sort order higher than or equal to the utmost top entry.

18. The computer program product of claim 12, wherein the set of top entries consists of a lowest sorted entry from each backend server in the set of backend servers.

19. The computer program product of claim 12, wherein the computer usable program code is stored in a computer readable storage medium in a data processing system, and wherein the computer usable program code is downloaded over a network from a remote data processing system.

20. The computer program product of claim 12, wherein the computer usable program code is stored in a computer readable storage medium in a server data processing system, and wherein the computer usable program code is downloaded over a network from a remote data processing system for use in a computer readable storage medium with the remote system.

* * * * *